Aug. 15, 1961     B. DELACROIX     2,996,413
APPARATUS FOR CONTACTING SOLIDS AND
FLUIDS, PARTICULARLY FOR EXTRACTING
SUGAR BY DIFFUSION
Filed Jan. 20, 1958     15 Sheets-Sheet 1
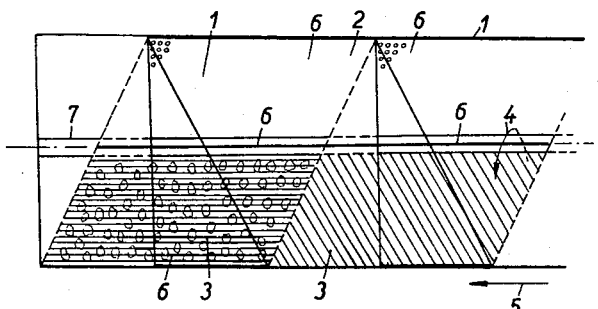
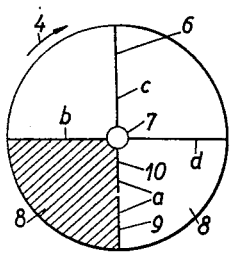 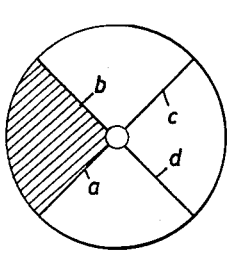 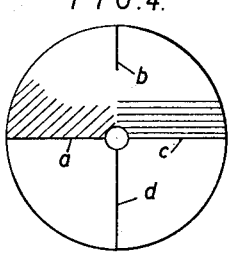
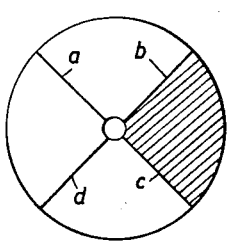 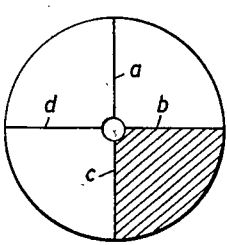 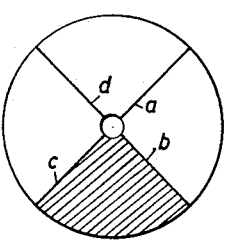
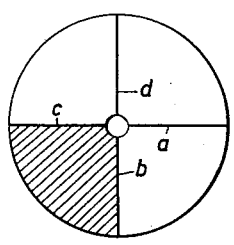 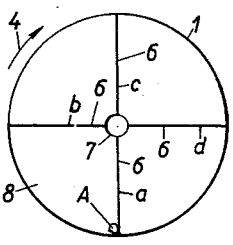 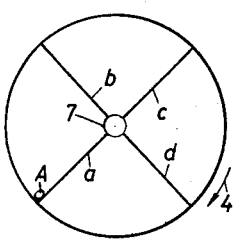
Baudouin DELACROIX
INVENTOR
By Wenderoth, Lind & Ponack
Attys Aug. 15, 1961
B. DELACROIX
2,996,413
APPARATUS FOR CONTACTING SOLIDS AND
FLUIDS, PARTICULARLY FOR EXTRACTING
SUGAR BY DIFFUSION
Filed Jan. 20, 1958
15 Sheets-Sheet 2
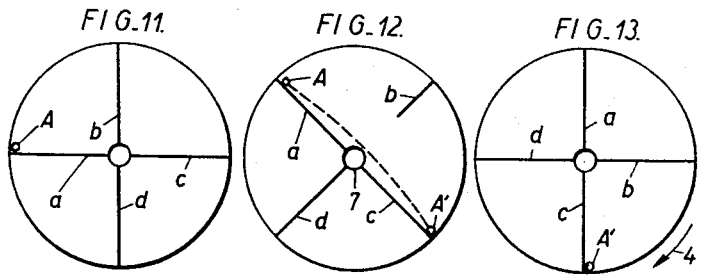
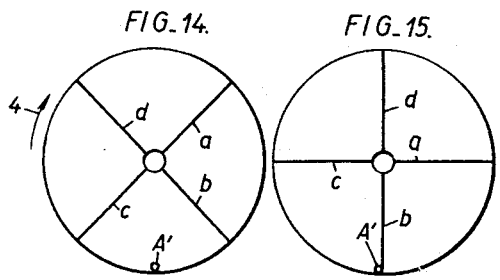
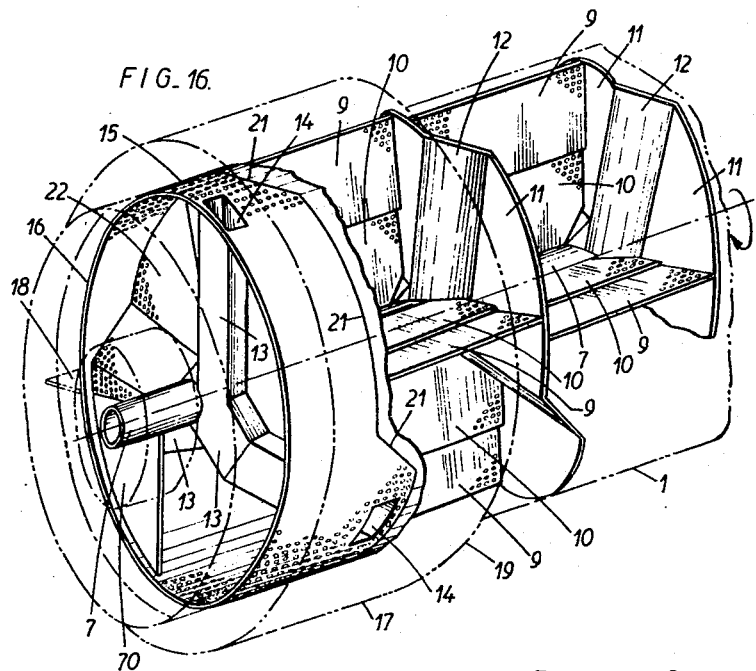
BAUDOUIN DELACROIX
INVENTOR
BY Wenderoth, Lind & Ponack
ATTORNEYS Baudouin DELACROIX
INVENTOR

FIG_25.

Aug. 15, 1961

B. DELACROIX 2,996,413

APPARATUS FOR CONTACTING SOLIDS AND
FLUIDS, PARTICULARLY FOR EXTRACTING
SUGAR BY DIFFUSION

Filed Jan. 20, 1958

FIG_27.

BAUDOUIN DELACROIX
INVENTOR

BY Wenderoth, Lind ed Ponack
ATTORNEYS

FIG_28.

United States Patent Office 2,996,413
Patented Aug. 15, 1961

2,996,413
APPARATUS FOR CONTACTING SOLIDS AND FLUIDS, PARTICULARLY FOR EXTRACTING SUGAR BY DIFFUSION
Baudouin Delacroix, Tirlemont, Belgium, assignor to Raffinerie Tirlemontoise, Tirlemont, Belgium, a company of Belgium
Filed Jan. 20, 1958, Ser. No. 710,007
Claims priority, application Belgium Jan. 29, 1957
17 Claims. (Cl. 127—3)

This invention relates to an apparatus for contacting solids and fluids, particularly for extracting sugar by diffusion, said apparatus comprising a drum with a substantially horizontal axis, into which is placed a screw conveyor, a cylindrical hollow shaft in said conveyor, means being provided at the entry of the screw conveyor for the fluid supply, other means being provided at the exit from the screw conveyor for the admission of solids, screens united with the screw conveyor being arranged in the liquid compartments formed by said screw for raising the solids in each compartment.

Such an apparatus may be used not only for extracting sugar, but also for treating by diffusion by means of a liquid, solids other than sugar beets; it may also be used for other physical or chemical treatments of solids by liquids or vice-versa, for example for extracting products adhering to solid materials or still for exchanging calories or frigories between a solid and a liquid.

Apparatus of the kind just defined are known for extracting sugar particularly and are described in the Belgian Patents 367,630, dated February 11, 1930, 371,926, dated July 16, 1930, and 475,626, dated February 23, 1948. In both these apparatus, the treated solids, which are raised by a screen in one particular compartment of the screw conveyor, are brought to another compartment by sloping walls arranged between both rows of axial screens. This results in a constructive complexity which may be eliminated, while adding to the efficiency of the apparatus, with the arrangement according to the invention. Indeed, in the apparatus according to the invention, there are provided substantially axial openwork partitions or screens arranged in each liquid compartment for raising the solids, there being spaces defined by two succeeding screens, the windings of said conveyor, the inner surface of said drum and the outer surface of said shaft, each screen comprising a fixed part and a movable part, control means for moving the movable part of said screens, and timing means associated with said control means and actuating said control means to move the movable part of each screen, when said screen has not yet reached the upright position thereof during rotation of the drum, to maintain said control means in action until said screen has moved past said upright position, to return said movable part and to maintain said movable part in the closed position thereof during the remaining part of the drum rotation.

Other details and features of the invention will stand out from the description of the accompanying drawings which show, by way of non limitative example, a particular embodiment of the apparatus according to the invention.

FIG. 1 is a very simplified diagrammatic view, in elevation and in section, of a part of an apparatus according to the invention.

FIG. 2 is a view in section, shown very diagrammatically, along line II—II of FIG. 1.

FIGS. 3 to 8 are similar to FIG. 2, but correspond to other angular positions of the apparatus.

FIGS. 9 to 15 are similar to FIGS. 2 to 8, but correspond to another use of the apparatus.

FIG. 16 is a diagrammatic view, in perspective, with parts broken away, of the apparatus as seen from the solid supply side.

Figure 17:
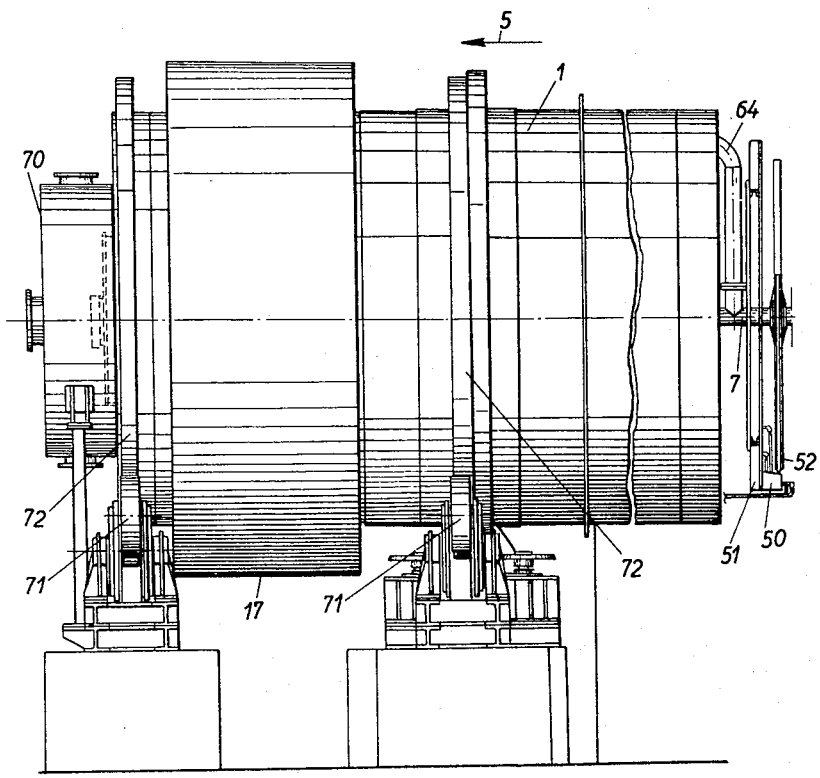
FIG. 17 is a side elevation view, with parts broken away, of the whole of the apparatus.

The apparatus shown comprises essentially a drum 1 rotating with a screw conveyor 2 supplied at its inlet with a liquid, for example water, and at its outlet with solids, for example beet roots. The turns of screw 2 defines a series of compartments such as 3, of liquid containing more and more sugar which lies in the lower part of the compartments 3, the various liquid portions undergoing no mixing. Indeed, the liquid does not rotate and if the screw rotates along the direction of the arrow 4, the liquid moves sidewise along the direction of the arrow 5, in the same way as a screw-nut the rotating of which is prevented and which surrounds a rotating screw. Two adjacent liquid compartments are staggered by a distance equal to one screw pitch.

Radial screens, such as 6, are arranged in axial planes of the drum, extending from said drum to the axial part 7 of the screw 2 and are bounded by the succeeding turns of the screw 2 between which they lie. It has been assumed that there are four screens for each pitch of the screw 2, said screens being substantially angularly spaced by 90°. These screens bound cells 8, four in number for each pitch of the screw 2.

Each screen 6 is here comprised of two parts which have been shown in FIG. 2 for the screen a only; the part adjacent the drum 1 and bearing the reference 9 is fixed, while the part near the axial part 7 and bearing the reference 10 is moveable.

So as to be able to understand the movements of the liquid and of the beet roots, there have been shown in FIGS. 2 to 8 seven succeeding angular positions of the apparatus, the angular deviation from one figure to another being equal to 45°.

It will be assumed that at time 0 the cell 8 bounded by two succeeding screens 6 with references $a$ and $b$ is filled with beet roots and occupies the position shown in FIG. 2; the two other screens, following screens $a$ and $b$, are indicated by references $c$ and $d$. The duration of a rotation is assumed to be equal to $t$. At the time $t/8$ (FIG. 3), the cell $(a, b)$ has rotated, along with screw 2, of an angle equal to 45°, without moving lengthwise, while the liquid did not rotate but has moved lengthwise along a distance $x/8$, if $x$ is the length of the pitch.

At the time $t/8$ (FIG. 4), the coordinates $(\alpha, x)$ of the cell have become (90°, 0), while the liquid has moved along another distance $x/8$. Moreover, the screen $b$ has been opened and all of the beet cell $(a, b)$ empties, the beets accumulating in the cell $(b, c)$ but moving along the screw 2, thus with a lengthwise component with a direction opposite the one of the movement of the liquid and equal to one fourth of the pitch, that is $(-x/4)$. The coordinates of the cell filled with beets thus change from (90°, 0) to (180°, $-x/4$). It is thus clear that the beets are guided, in the last-mentioned displacement, by the very turns of the screw conveyor.

The various steps of the displacements of the liquid and of the beets are summed up in the following table:

*Table I*

| Figures | Times | Beets | | Liquid |
|---|---|---|---|---|
| | | $\alpha$ | $x$ | $x$ |
| | | Degrees | | |
| 2 | 0 | 0 | 0 | 0 |
| 3 | $t/8$ | 45 | 0 | $x/8$ |
| 4 | $t/4$ | 90–180 | $-x/4$ | $x/4$ |
| 5 | $3t/8$ | 225 | $-x/4$ | $3x/8$ |
| 6 | $t/2$ | 270 | $-x/4$ | $x/2$ |
| 7 | $5t/8$ | 315 | $-x/4$ | $5x/8$ |
| 8 | $3t/4$ | 360 | $-x/4$ | $3x/4$ |

It may be seen that, after the displacement of the beets from cell $(a, b)$ to cell $(b, c)$, the beets move angularly with the cell which contains them and do not undergo any further lengthwise displacement. Moreover, at time $3t/4$, the position of the beets is the same as at time 0. There is thus one transferring of beets for every ¾ of a rotation and the absolute lengthwise displacement of the beets is then equal to $(-x/4)$, so that for one rotation of the screw conveyor, the displacement of the beets is equal to $(-x/3)$. The rotating displacement is for every ¾ of a rotation, from $3x/4 + x/4 = x$.

Between two consecutive transferring of beets, the beets from a particular cell 8 move from one compartment 3 with respect to the liquid, that is they are contacted with the liquid of the compartment which precedes along the conveying direction of the screw (arrow 5), the compartment 3 the beets have left; the apparatus thus works according to the counter-current principle. Moreover, each beet batch dips successively in each liquid compartment; the raising, the draining and the transferring of the beets occur once every ¾ of a rotation if there are four screens to the pitch and once every $n-1/n$th of a rotation if there are $n$ screens to the pitch.

It has been assumed up to now that the beets fill completely a cell 8. This is not always the case, as the apparatus may work with less complete batches or it might be used for other treatments, in which the solids of a cell 8 do not fill it and may move in the liquid of a compartment 3. If one considers the extreme case (FIG. 9) where there is a single beet root A in front of the screen $a$ and if it is assumed that the sliding angle of the beets is equal to 45°, it is possible to compile, as before, the following table which corresponds to FIGURES 9 to 15.

*Table II*

| Figures | Times | Beets | | Liquid |
|---|---|---|---|---|
| | | $\alpha$ | $x$ | $x$ |
| | | Degrees | | |
| 9 | 0 | 0 | 0 | 0 |
| 10 | $t/8$ | 45 | 0 | $x/8$ |
| 11 | $t/4$ | 90 | 0 | $x/4$ |
| 12 | $3t/8$ | 135–315 | $-x/2$ | $3x/8$ |
| 13 | $t/2$ | 360 | $-x/2$ | $x/2$ |
| 14 | $5t/8$ | 360 | $-x/2 + x/8$ | $5x/8$ |
| 15 | $3t/4$ | 360 | $-x/2 + x/8 + x/8$ | $3x/4$ |

It may be seen that the beet root does first rotate with the screen $a$ without moving lengthwise. At the time $3t/8$ (FIGURE 12) the screen $b$ has been opened and the beet root A, the coordinates of which have become (135°, 0) falls in A' along the conveyor screw, so that the angle $\alpha$ changes from 135° to $(135° + 180°)$, that is 315°, while the beet moves lengthwise but in the direction opposite the displacement direction of the liquid, along a distance equal to one half of the pitch, that is $(-x/2)$. Then the beet root, after moving angularly to its lowest position (FIGURE 13), remains there while moving lengthwise in the same direction as the liquid (FIGURES 14 and 15).

There will again be one transferring for every ¾ of a rotation. The absolute displacement of the beets during ¾ of a turn is equal to $(-x/2 + x/8 + x/8)$, that is $(-x/4)$. The relative displacement is still equal to $x$ for ¾ of a rotation, thus every time that raising, draining and transferring of beets occur.

The conclusions are the same in both cases and are substantially true for intermediate cases. Moreover, when the batches of beets, or generally of treated solids fill enough the cells 8, it is possible to omit the moving part 10 of some screens 6. It is for example possible to omit the moveable part of the third screen, starting from the inlet of the conveyor screw 2, and from the following odd screens, but with the moveable part of the last screen being maintained. The batches of beets fall at the proper time through the opening replacing the omitted moveable part of the screen concerned and, except for the beet fall and transferring time, they are held either by the screen which, together with the considered screen, limits the considered cell, or by the adjacent beet batch. It is thus possible to let pass through this opening, the beet roots raised by the screen which follows, along the conveying direction of the screw, the screen provided with said opening and to bring these beets on the preceding screen, without it being possible for these beets to cross two screens at the same time nor to come back to the cell they have just left. The beet roots thus cannot, while being raised by the screen they have just gone through, undergo a displacement in a direction opposite to the desired one.

It has been assumed that the screens are evenly spaced from one another and that, if there are $n$ screens to one pitch of the screw 2, the number $n$ is an integer, that is that the angle $360°/n$ which lies between two succeeding screens is a whole submultiple of 360°. But, in this case, raising of the beet roots occurs on several screens at the same time and the resistant torque of the apparatus takes at $n$ times for each rotation a very high value. To regularize this resistant torque, it is advantageous to adopt an angular spacing between two succeeding screens which is slightly different from a whole submultiple of 360°, $n$ thus not being an integer any more. It is preferably arranged to have the first and last screens lie in the same axial plane of the drum. In such a case, the staggering angle of a screen, that is the absolute value of the difference between $360°/nN$ and the above-mentioned submultiple of 360° is equal to $360°/n$, with N being equal to the total number of cells 8. The screens may be staggered in either direction, which means that the angular spacing 360°/n may be larger or smaller than the considered whole submultiple of 360°.

The principles on which the apparatus is based having been stated, there will now be described below an actual embodiment of an apparatus, as it is best shown in FIGURES 16 to 24, in which are to be found the main elements already described and which bear the safe reference numerals.

The screw conveyor 2 is not made up here from an actual helical wall, but by an approximate helicoid made up of a series of succeeding parts of diametral sector plates such as 11 (FIGURES 16, 23 and 29), which are connected by inclined connecting plates such as 12.

Figure 24:
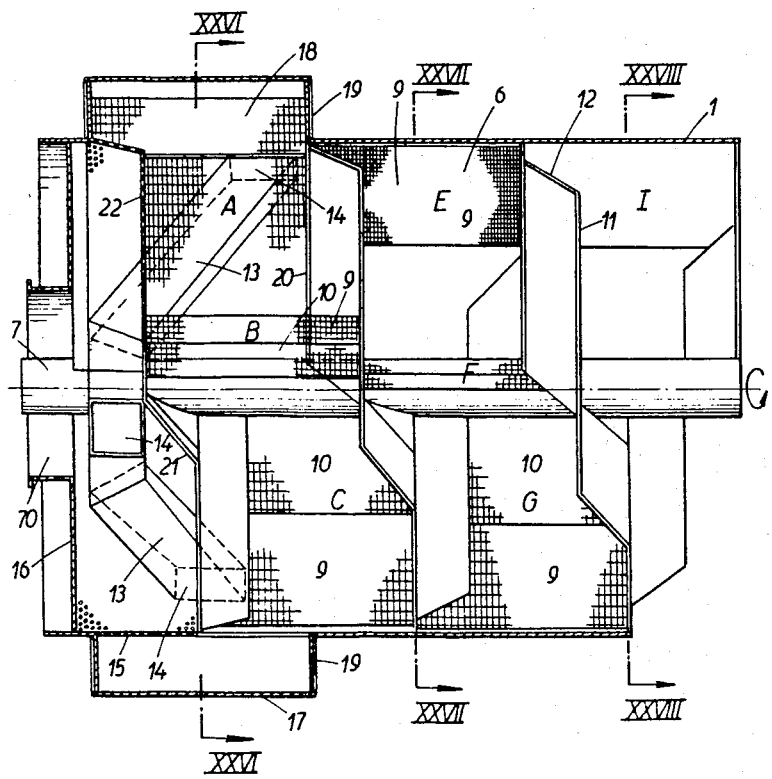
FIG. 24 is a sectional diagrammatical view along a vertical diametral plane of the whole of the apparatus.
Figure 25:
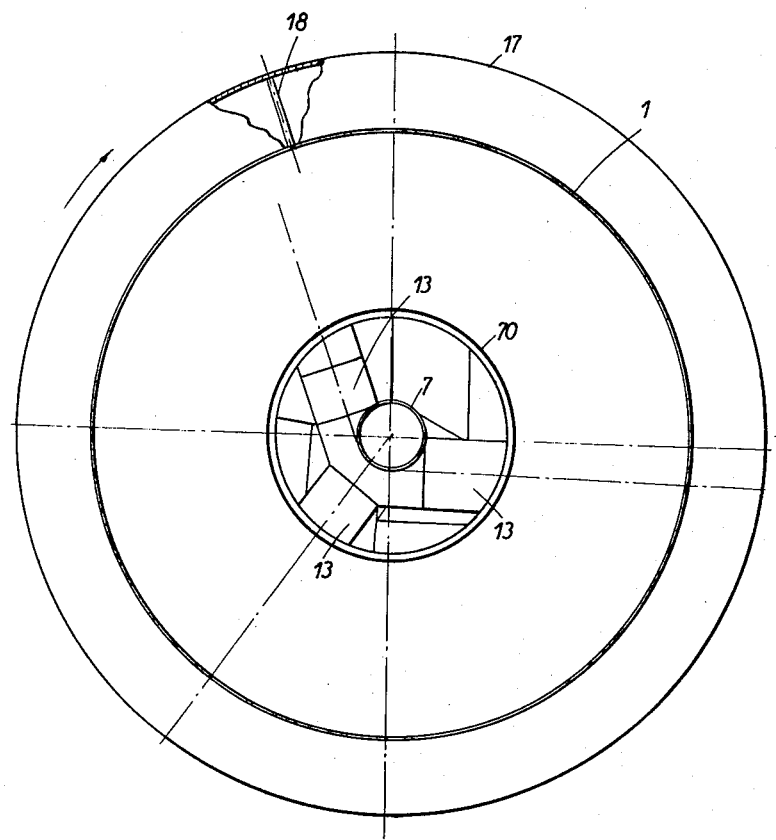
FIG. 25 is an end view of the apparatus as seen from the solid inlet side, with parts broken away.
Figure 26:
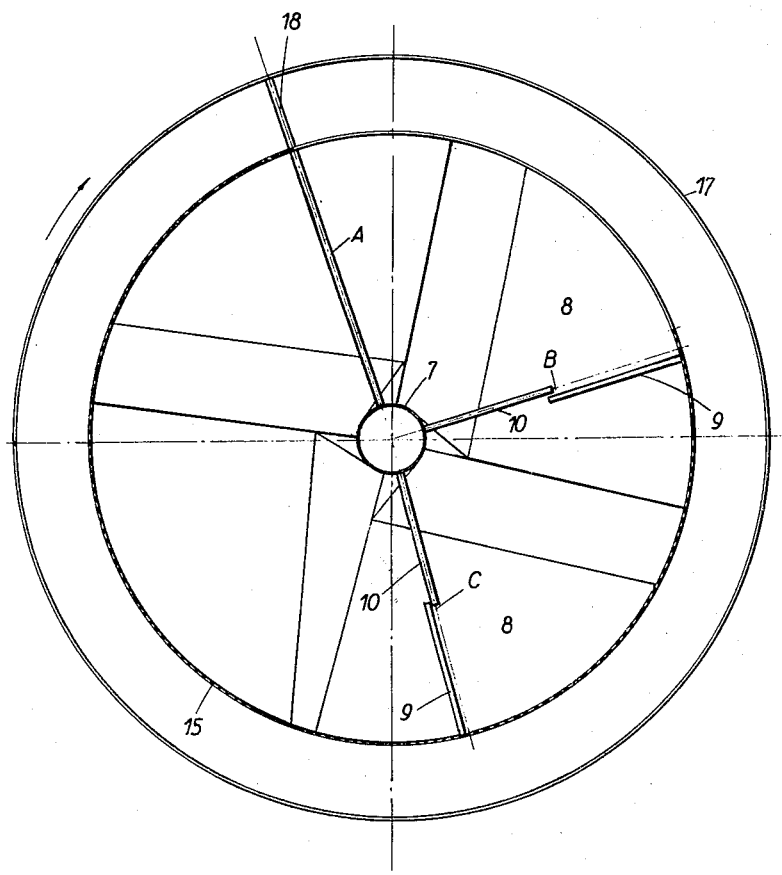
FIG. 26 is a sectional view along line XXVI—XXVI of FIG. 24.

The apparatus may comprise thirty-one cells 8 but for clarity of the drawings, the elements pertaining to eight cells only have been shown in FIG. 24. Each one of the cells is limited by two succeeding screens 6 and by two portions of the conveyor screw which are each comprised of an inclined part 12 and of one part of adjacent portions of diametral sector plates 11. They are further limited by the shaft 7 and the drum 1. Two succeeding screens 6 have an angular spacing which is equal to 360°/n+360°/nN, that is approximately 93°. The screens 6 have been designated individually and succeedingly by the letters A to I.

Figure 27:
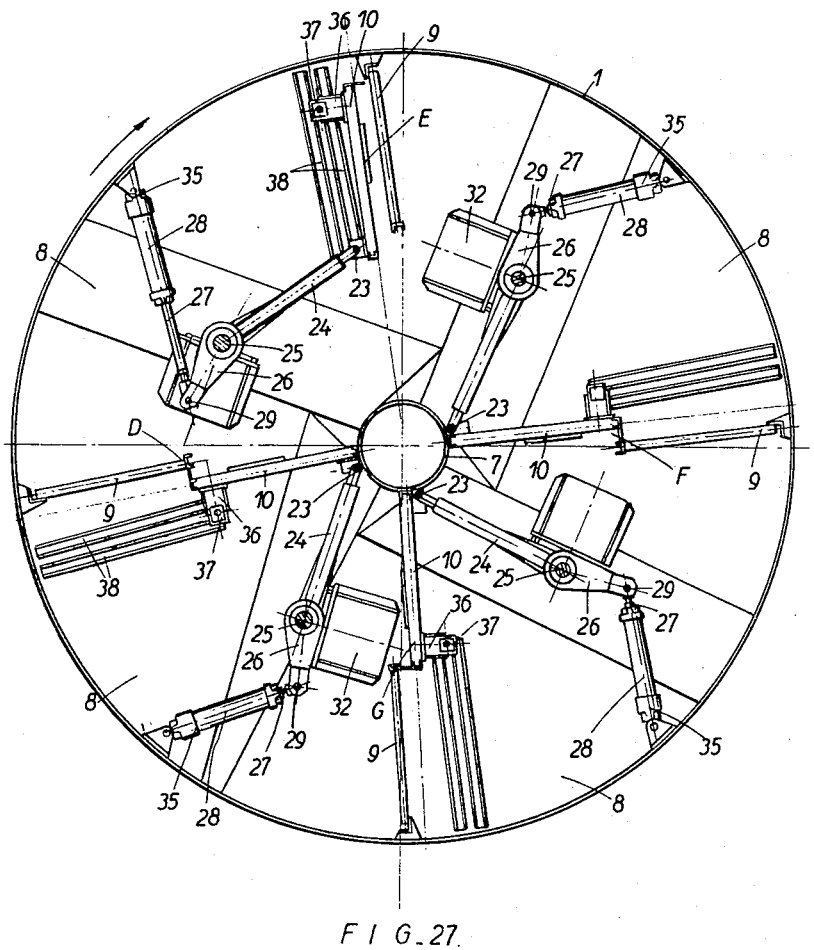
FIG. 27 is a sectional view along line XXVII—XXVII of FIG. 24, in which parts associated with the screens have been added.
Figure 28:
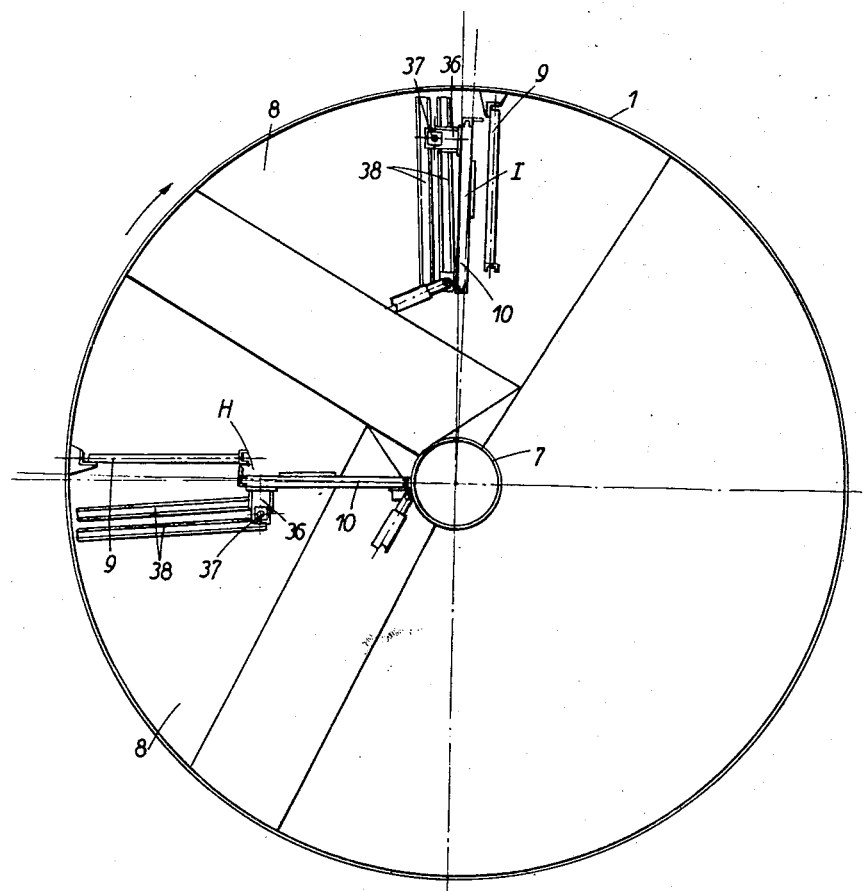
FIG. 28 is a sectional view along line XXVIII—XXVIII of FIG. 24, in which parts associated with the screens have been added.
Figure 29:
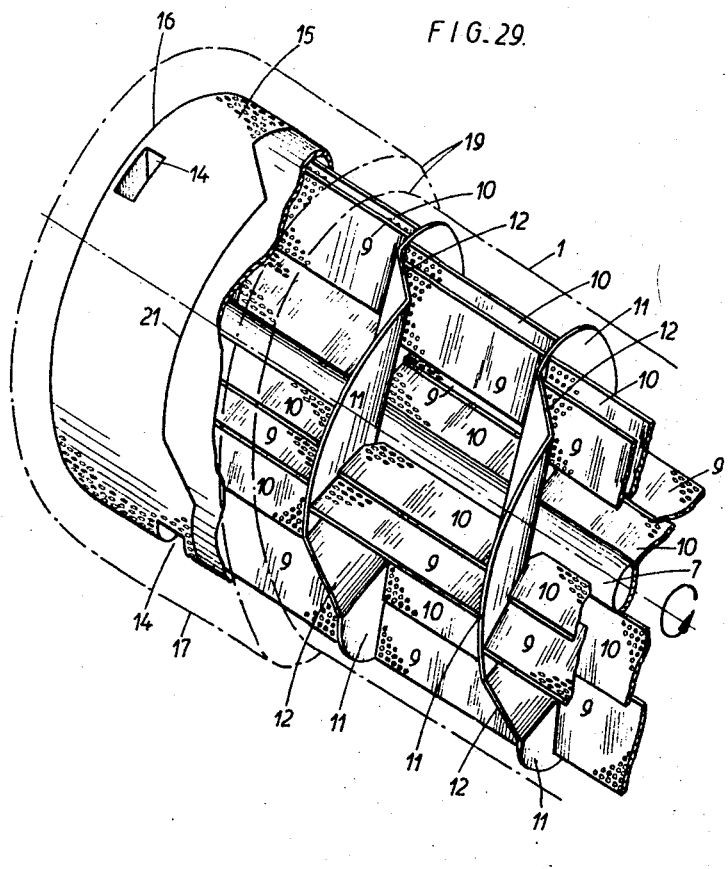
FIG. 29 is a diagrammatic view, in perspective, with parts broken away, of the part of the apparatus shown in FIG. 16, after a slight rotation of the apparatus, and as seen from the liquid supply side.
Figure 30:
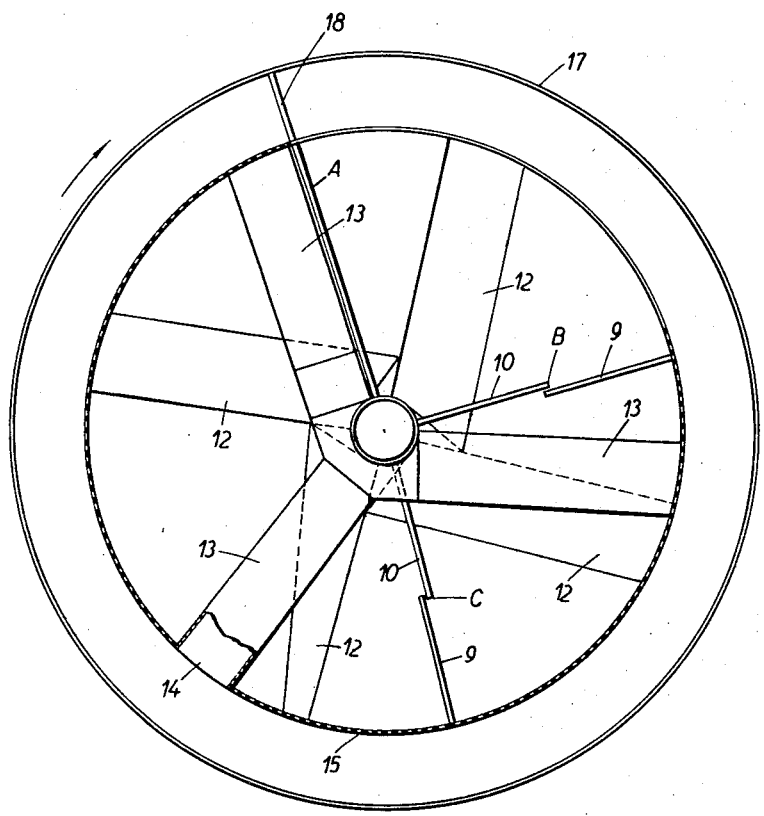
FIG. 30 is a sectional view along line XXVI—XXVI of FIG. 24, in which solid supply pipes have been added as viewed at the solid supply end of the apparatus.

For the beet supply, there have been provided (FIGURES 16, 24, 25 and 30) three channels or pipes 13 which have an angular spacing of about 120° and which communicate, on the one hand, with the hollow shaft 7 of the drum 1, said shaft forming the axial part of the screw conveyor 2 which has been referred to above; the three channels open, on the other hand, into a housing 17 through openings 14 provided in a perforated cylindrical wall 15 which is an extension of the drum 1 and which is bounded by an end wall 16. In FIGURES 16 and 29, the housing 17, the drum 1 and the wall 16 have been shown in dotted lines, to add to the clearness of the drawing. The beet roots are fed into the hollow shaft which rotates with the drum 1. A supply screen 18, which is actually the first screen A which is extended so that it reaches all the way from between the inside face of the housing 17 to the hollow shaft 7 and is bounded on its edges by the end wall 16 and the conveyor screw 2. The angular spacing between the screen 18 and the next adjacent screen B is also equal to about 93°, these two screens define the first cell 8. The drum is not present on the outer periphery of this cell (see FIG. 27).

The housing 17 is bounded, at the end thereof opposite wall 16, by an annular wall 19 which lies in the diametral plane comprising the portion 20 of diametral plane which bounds the supply screen 18 and which is the fourth portion of diametral plane forming the conveyor screw, counting these portions starting with the outlet of the conveyor screw. The housing 17 is thus limited here, in the axial direction, to the length of the supply screen 18, but it might extend beyond this screen; there must be a volume large enough to store up to the proper level the solids to be introduced in the first cell 8. The line 21 which separates the perforated wall 15 from the drum 1 follows the trace of the outlet end of the screw 2. The drum not only stops at line 21, but also at the screen B adjacent screen 18 and to the annular wall 19, which leaves completely open the inlet to the first cell 8 and thus forms a large opening for the supply to this cell.

The wall 22 which is part of the conveyor screw and which delimits the first cell 8, on the side of end wall 16, is perforated. The three channels or pipes 13 are arranged so that none of them passes through cell 8.

Each screen 6 is comprised, as stated above, of a fixed part 9 and of a moveable part 10. The arrangement of said part 10 is such that it may disappear behind the corresponding fixed part 9. For this purpose, each part 10 is hinged, adjacent the shaft 7, on one of the ends 23 (FIGURES 20, 21, 27 and 28), of two levers 24 integral with a shaft 25 bearing a control lever 26. The control lever 26 is hinged on the end 29 of a piston 27 of a jack 35. The cylinder 28 of the jack is attached on the inside surface of drum 1.

Figure 22:
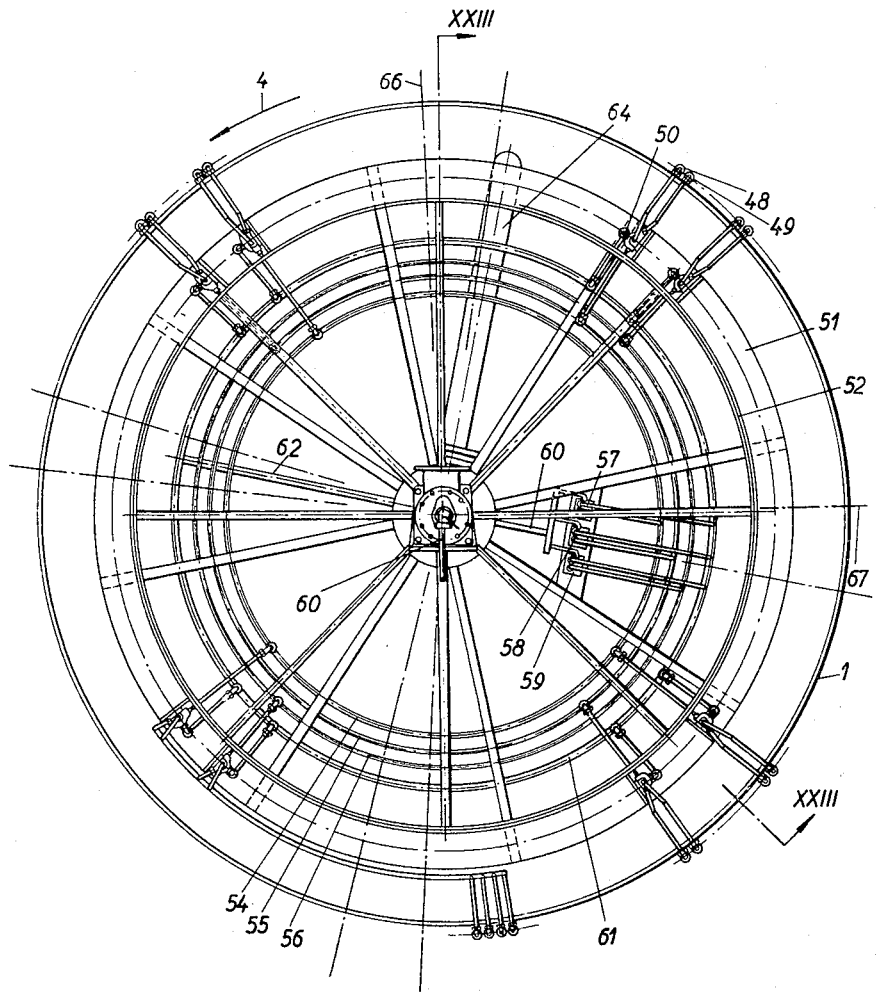
FIG. 22 is an end view of a portion of the apparatus as seen from the liquid inlet side.
Figure 23:
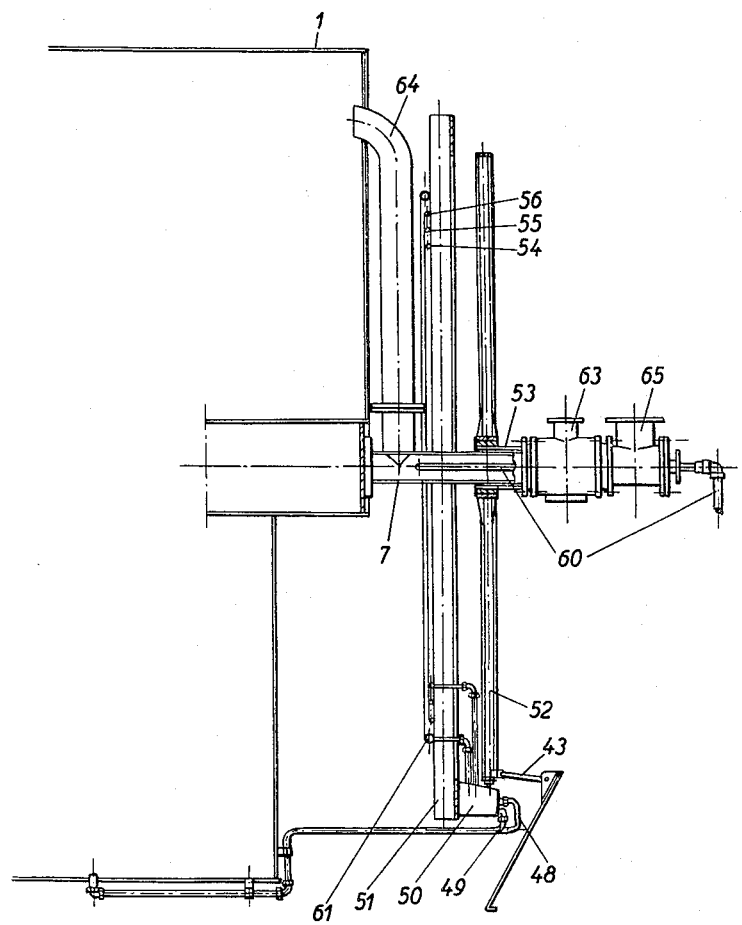
FIG. 23 is a view in section along XXIII—XXIII of FIG. 22.

The shaft 25 is supported by fixed bearings 30 and 31 mounted on supports 32 and 33 attached to the portions of diametral planes 39 and 40 which partially define the corresponding cell 8. It is seen in FIGURE 22, that edges 34 and 44 are formed by the joint between portions of diametral planes 39 and 41 and inclined planes 42 which form one of the side walls of two adjacent cells 8. Near the end of the moveable part 10 which is adjacent the fixed part 9, are provided two slides 36, the working part of which is formed by a shoulder or lug 37 which is engaged between guides 38 attached to the portions of diametral planes 40 and 41 and arranged along a line which forms a small angle with the fixed part 9. During the movement of the moveable part 10, the lug 37 may rotate between the guides 38, which insures proper locating of the moveable part 10 in the retracted position. The volume occupied by the fixed part and the moveable part 10 in the retracted position thereof is very small, due to the relative arrangement and to the driving of the various elements, so that the effective volume of cell 8 remains as large as possible.

The jacks 35 are supplied with oil pressure through flexible couplings 46 and 47 which are connected inside the drum 1 to rigid pipes 48 and 49 in which are positioned valves 50 (FIGURES 22 and 23) which are attached to a ring 51 mounted on the drum and which are controlled by a fixed cam 52 which is cut out in adequate areas. The cam 52 is arranged around a fixed sleeve 53 which surrounds the shaft 7 and it is held at the periphery thereof by an arm 43.

The valves 50 are connected not to a single oil supply pipe but well to three pipes 54, 55 and 56 which are connected, by flow-regulators 57, 58 and 59 to a main supply pipe 60. There is thus prevented a defective control of some screens, due to too large variations in the oil-pressure supply when the control periods of several valves 50 coincide at least partially.

Another number of pipes such as 54, 55 and 56 might of course be selected; the connection of the valves 50 with the pipes 54, 55 and 56 is made so as to reduce such coincidence as far as possible.

The valves 50 are connected, on the other hand, to an oil return pipe 61 which communicates with pipe 62.

The pipe 60 is led axially out of the hollow shaft 7, while the pipe 62 communicates with the outside oil supply tank through a ring connection 63.

The supply of liquid to the drum is made through a fixed connection 65 communicating, through the hollow shaft 7, with a large-diameter pipe 64 which opens between the first screen, that is the one at the inlet to the conveyor screw, and the adjacent screen. In FIGURE 22, the traces of the median planes of these screens bear the reference numerals 66 and 67, respectively.

Means (not shown) of known type are provided to periodically cut-off the liquid supply, so as to have the supply effective approximately from the time of the opening of the screen the trace of which is 67 up to approximately the time when this screen begins to raise the solids which have passed therethrough, so as to prevent mixing the liquid and the treated solids being discharged.

The screen I the trace of which is 66 is replaced by a solid wall with a fixed part 68 and a moveable part 69. This latter part is controlled as the moveable parts 10 of the screens 6 and is used for the discharge of the treated solids. All the above conditions regarding the arrangement of the screens 6 are also true for the wall replacing the screen I.

The drawing off of the liquid occurs by overflow by means of an opening 70 provided in the axial area of the end wall 16.

Figure 18:
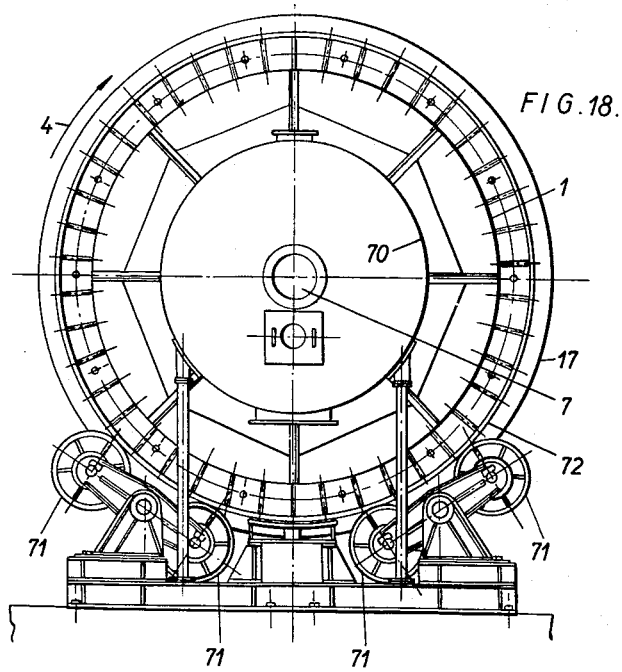
FIG. 18 is an end view of the apparatus as seen from the liquid outlet side.
Figure 19:
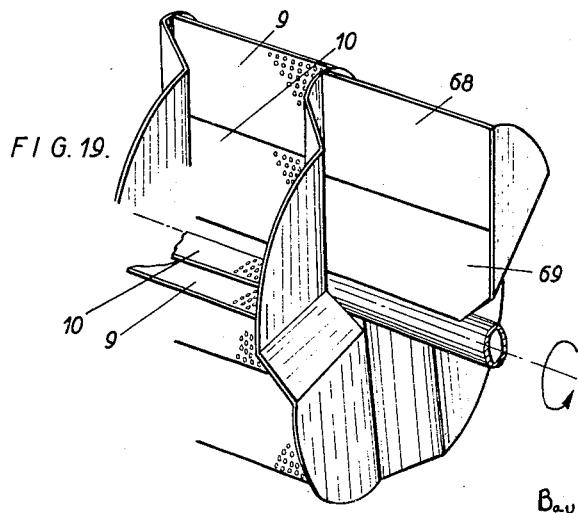
FIG. 19 is a diagrammatic perspective view of the screw conveyor inlet.
Figure 20:
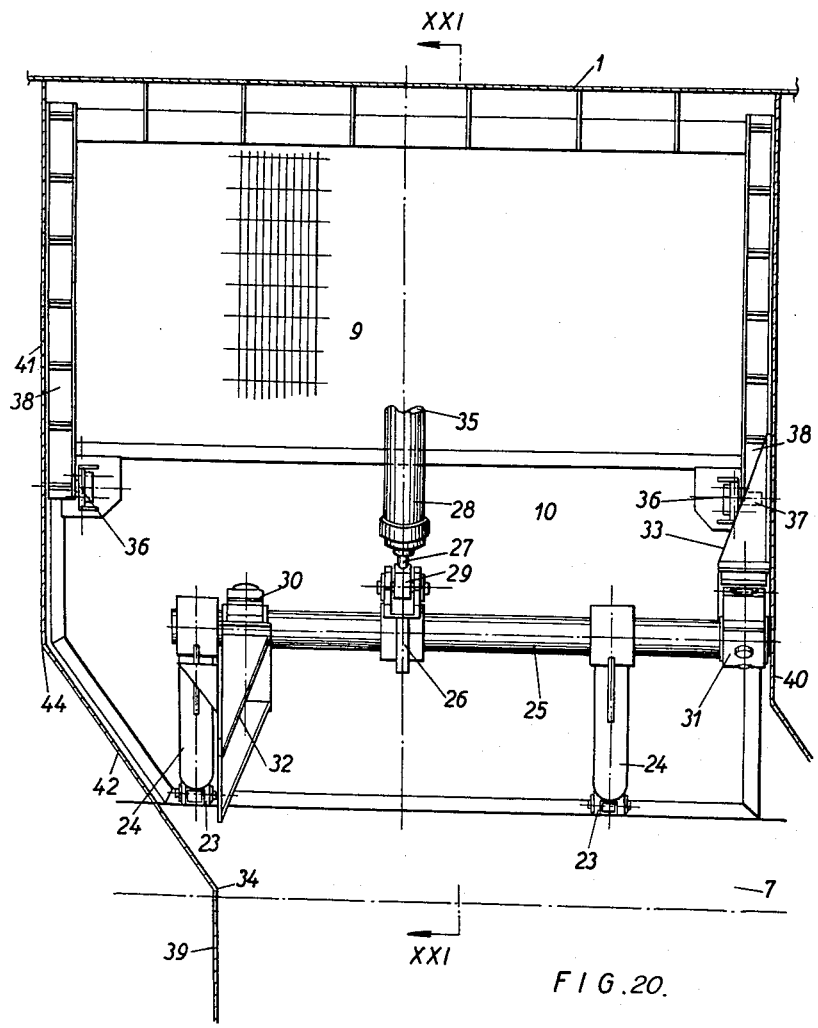
FIG. 20 is a side elevation view of one cell of the apparatus, the outside drum and the side walls of the cell being considered as shown in section.
Figure 21:
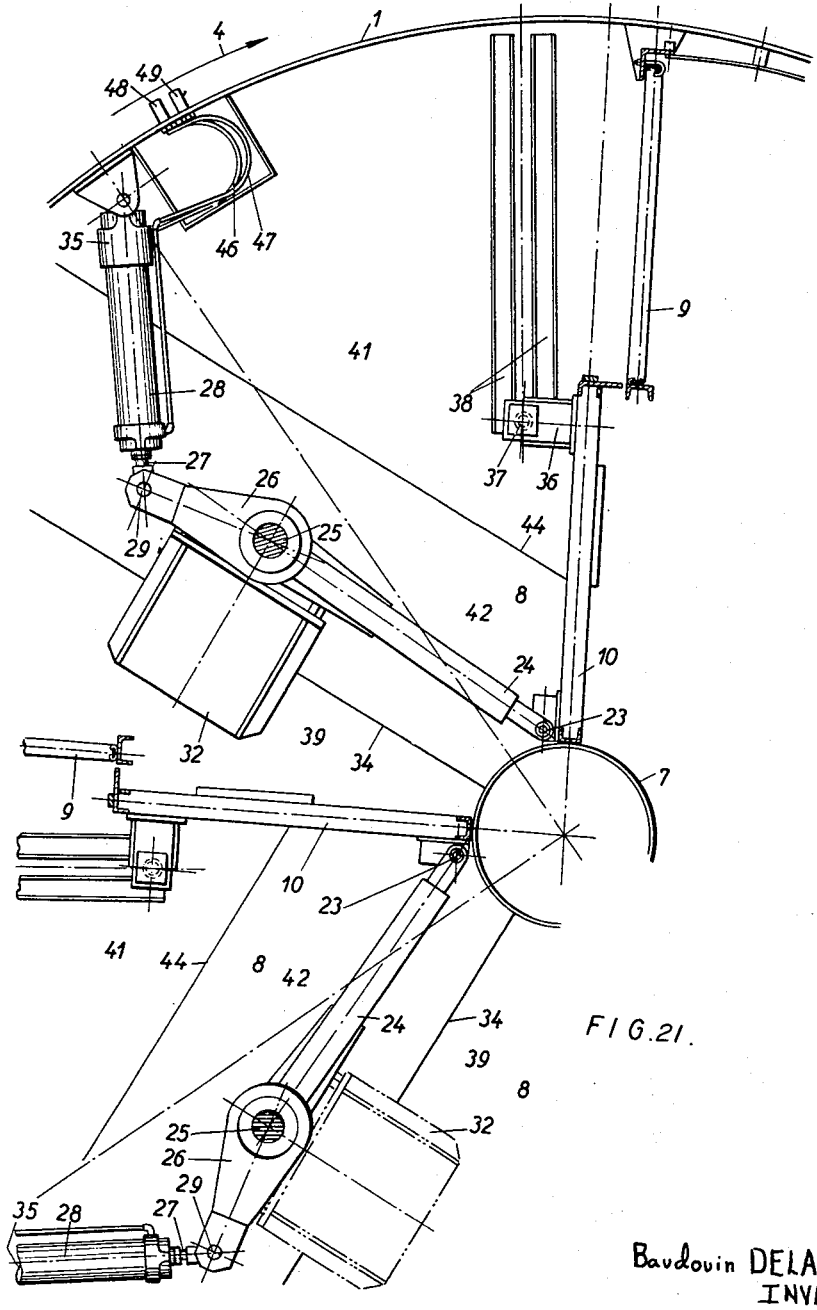
FIG. 21 is a view taken in section along line XXI—XXI of FIG. 20.

The drum 1 is supported by means of rollers 71 cooperating with guiding rings 72 (FIGURES 17 and 18).

FIGS. 26 to 29 correspond to an angular position substantially similar to the angular position shown in FIG. 4; the movable parts of screens E and I are thus in their retracted position; the screen A does not have a movable part because it is the supply screen; the screen I in the position of FIG. 29 permits the exit of the treated beets.

It must be understood that the invention is not limited in any way to the embodiment described and that many changes may be brought therein without departing from the scope of the appended claims. It is for example possible, as stated above, to omit the moveable part of some screens. It would also be possible to change the control means for these moveable parts by replacing the jacks by mechanical drives, counter-weights, etc.

I claim:

1. Apparatus for contacting solids and fluids, particularly for extracting sugar by diffusion, said apparatus comprising in combination a drum with a substantially horizontal axis, a screw conveyor in said drum, a cylindrical hollow shaft in said conveyor, fluid supply means at the inlet end of the screw conveyor for supplying fluid, solid supply means at the outlet end of the screw conveyor for the admission of solids, said screw conveyor defining liquid compartments between the succeeding turns of said conveyor, a plurality substantially axial radially extending screens between the turns of the conveyor, cells defined by two succeeding screens, the turns of said conveyor, the inner surface of said drum and the outer surface of said shaft, each screen comprising a fixed part and a movable part, control means attached to said movable part for moving the movable part of said screens, and timing means associated with said control means and actuating said control means to move the movable part of each screen when said screen has not yet reached the upright position during the rotation thereof, to maintain said control means in action until said screen has moved past said upright position, to return said movable part and to maintain said movable part in the closed position thereof during the remaining part of the drum rotation.

2. Apparatus as claimed in claim 1 in which said conveyor has an axially and radially extending solid wall at the inlet of the conveyor screw between the end of the screw conveyor and the next turn of the screw conveyor, said solid wall comprising a fixed part and a movable part, control means for moving the movable part of said solid wall, and timing means associated with said control means and actuating said control means to move the movable part of said wall when said wall has not yet reached the upright position during rotation of said drum, to maintain said control means in action until said wall has moved past said upright position, to return said movable part and to maintain said movable part in the closed position thereof during the remaining part of the drum rotation.

3. Apparatus as claimed in claim 2 in which said fluid supply means comprises a liquid supply inlet provided between said solid wall and the screen next succeeding it along the conveying direction of the screw, said inlet being adjacent the inside surface of the drum and of said screen, a liquid supply pipe communicating with said inlet, said liquid supply pipe supplying liquid only from about the time the movable part of said screen is moved to about the time said screen reaches the bottom position during rotation of said drum.

4. Apparatus as claimed in claim 1 in which said movable part of each screen is adjacent to said shaft.

5. Apparatus as claimed in claim 2 in which said movable part of the solid wall is adjacent to said shaft.

6. Apparatus as claimed in claim 1 and further comprising hinging means for supporting said movable parts of said screen adjacent to that edge thereof which lies, in closed position, adjacent said shaft, a slide on said hinge, and a slide-way on said conveyor turn adjacent the screen forming a slight angle with the rear face of the fixed part of the screens and in which said slide slides, said movable parts moving with said slide behind the fixed part of the screens.

7. Apparatus for contacting solids and fluids, particularly for extracting sugar by diffusion, said apparatus comprising in combination a drum with a substantially horizontal axis, a screw conveyor in said drum, a cylindrical hollow shaft in said conveyor, rotating means for rotating said drum and said conveyor, said screw conveyor defining liquid compartments between the succeeding turns of said conveyor, a plurality substantially axial radially extending screens between the turns of the conveyor, cells defined by two succeeding screens, the turns of said conveyor, the inner surface of said drum and the outer surface of said shaft, each screen comprising a fixed part and a movable part, control means for moving the movable part of said screens, timing means associated with said control means and actuating said control means to move the movable part of each screen when said screen has not yet reached the upright position thereof during rotation of said drum, to maintain said control means in action until said screen has moved past said upright position, to return said movable part and to maintain said movable part in the closed position thereof during the remaining part of the drum rotation, a partially perforated cylindrical wall around the outlet end of said screw conveyor, an end wall perpendicular to said shaft on the end of said cylindrical wall, a housing around said cylindrical wall limited by an outer cylindrical wall and having said end wall as one end thereof, a pipe opening into the housing outside of the perforated cylindrical wall for supplying the solids, a radially extending supply screen coplanar with the axis of said conveyor and extending from the inside surface of the housing to said shaft and between the screw conveyor and the end wall, the angular spacing of said supply screen and of the last screen of the screw conveyor being substantially equal to the angular spacing of two succeeding screens, the perforated cylindrical wall having a supply opening therein and extending from the supply screen to the last screen of the screw.

8. Apparatus as claimed in claim 7 further comprising a diametral annular wall lying at the end of the supply screen opposite to said end wall, said annular wall extending from the outer cylindrical wall of the housing to the outer surface of said drum, and defining the end of said housing on the same end of said supply screen.

9. Apparatus as claimed in claim 7 in which said end wall has an axial opening therein for permitting overflow of the fluid which accumulates in the housing.

10. Apparatus as claimed in claim 1 in which said screw conveyor comprises a plurality of diametral sector plates and inclined connecting plates connecting successive sector plates, a part of a diametral sector plate and one of the inclined connecting plates forming a portion of the conveying screw which corresponds to an angle which is equal to the angular spacing between two succeeding screens.

11. Apparatus as claimed in claim 10 in which each screen is connected between two diametral sector shaped plates.

12. Apparatus as claimed in claim 1 in which the angular spacing between two succeeding screens is $360°/n$, $n$ being an integer.

13. Apparatus as claimed in claim 1 in which the angular spacing between two succeeding screens is $360°/n + 360°/nN$, $n$ being an integer and $N$ being the total number of cells.

14. Apparatus as claimed in claim 1, and further comprising means for rotating said drum along with said conveyor, driving means provided outside of said drum, said control means for moving said movable parts of said screens being driven by said driving means.

15. Apparatus as claimed in claim 14 in which said control means for moving the moveable part of said screens comprises cylinders supported by the inside surface of said drum, pistons cooperating with said cylinders and connected in operating relationship with said moveable parts of said screens, an axial fluid pressure supply pipe and connected to said cylinders, and an outside distributing network connected to said supply pipe and rotating with said drum.

16. Apparatus as claimed in claim 15 and further comprising hinging means on the inside surface of said drum supporting said cylinders.

17. Apparatus as claimed in claim 15 further comprising a fixed cam cooperating with said outside network, said fixed cam constituting said timing means associated with said control means.

References Cited in the file of this patent

UNITED STATES PATENTS

| | | |
|---|---|---|
| 2,569,199 | Sinet | Sept. 25, 1951 |
| 2,658,010 | Silver | Nov. 3, 1953 |